United States Patent Office 3,092,479
Patented June 4, 1963

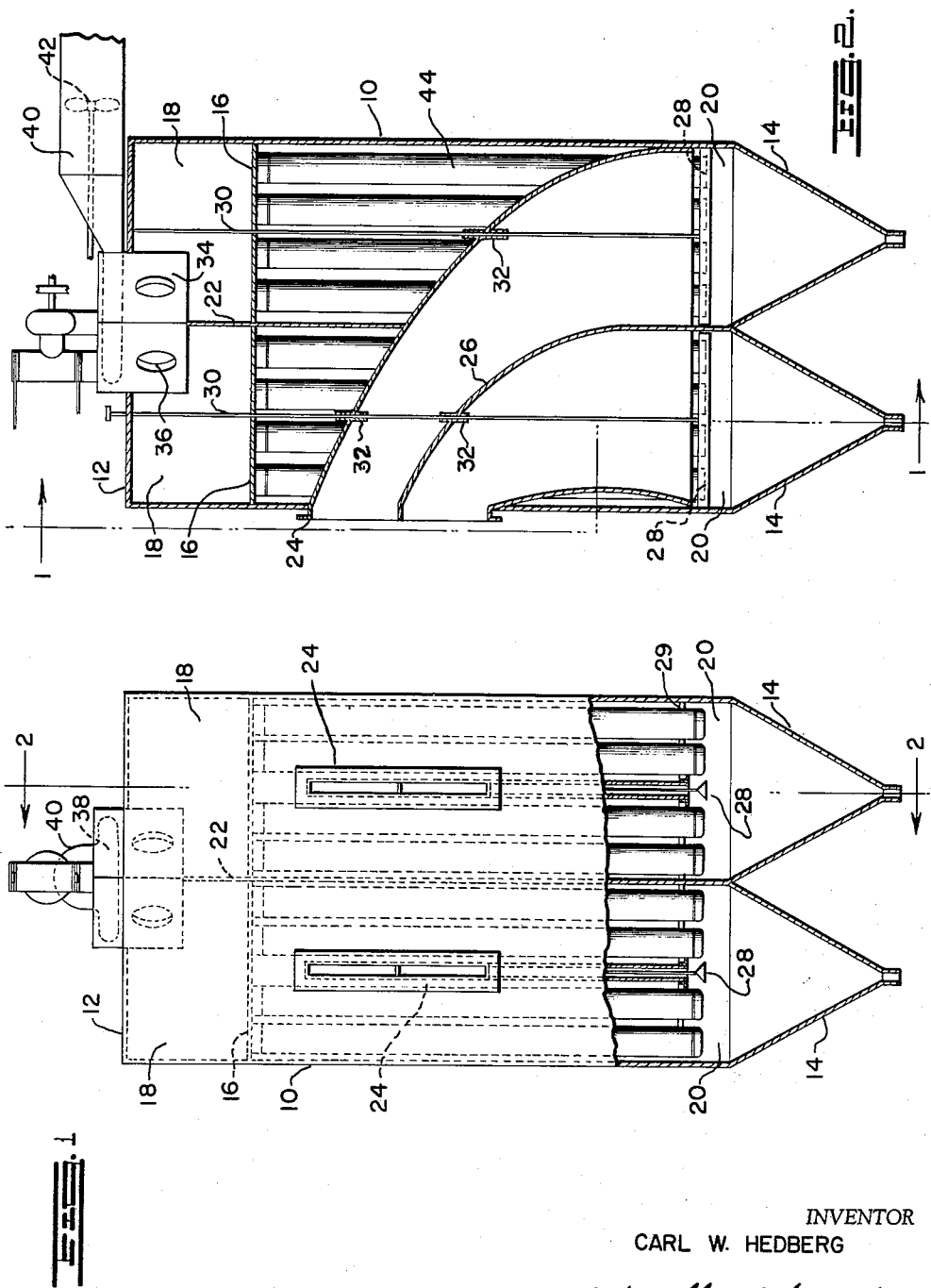

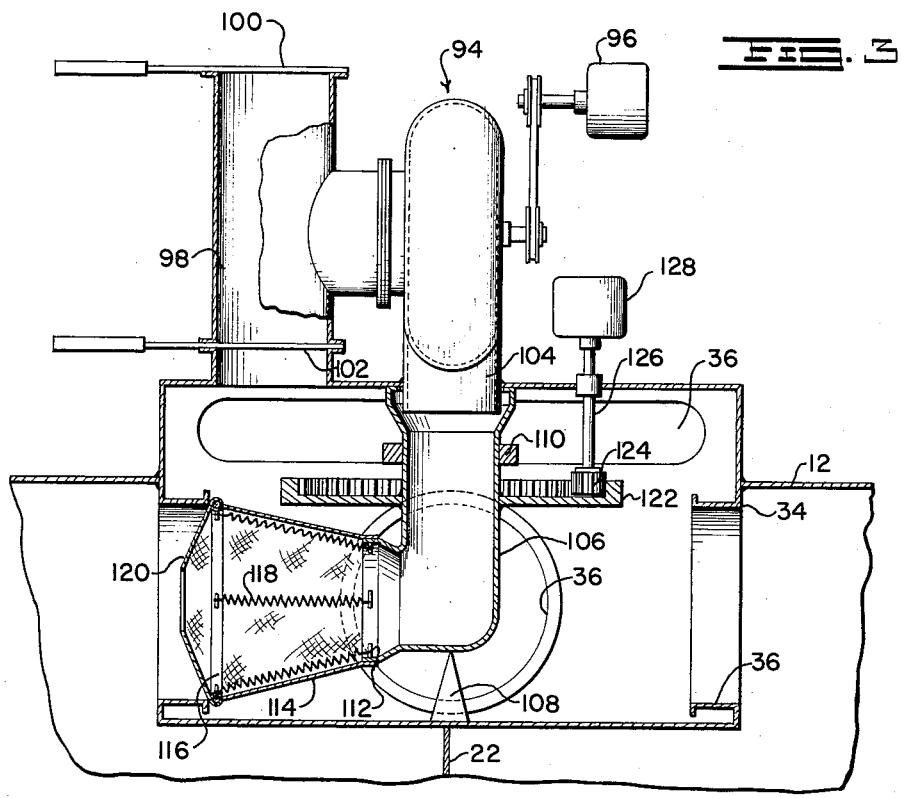

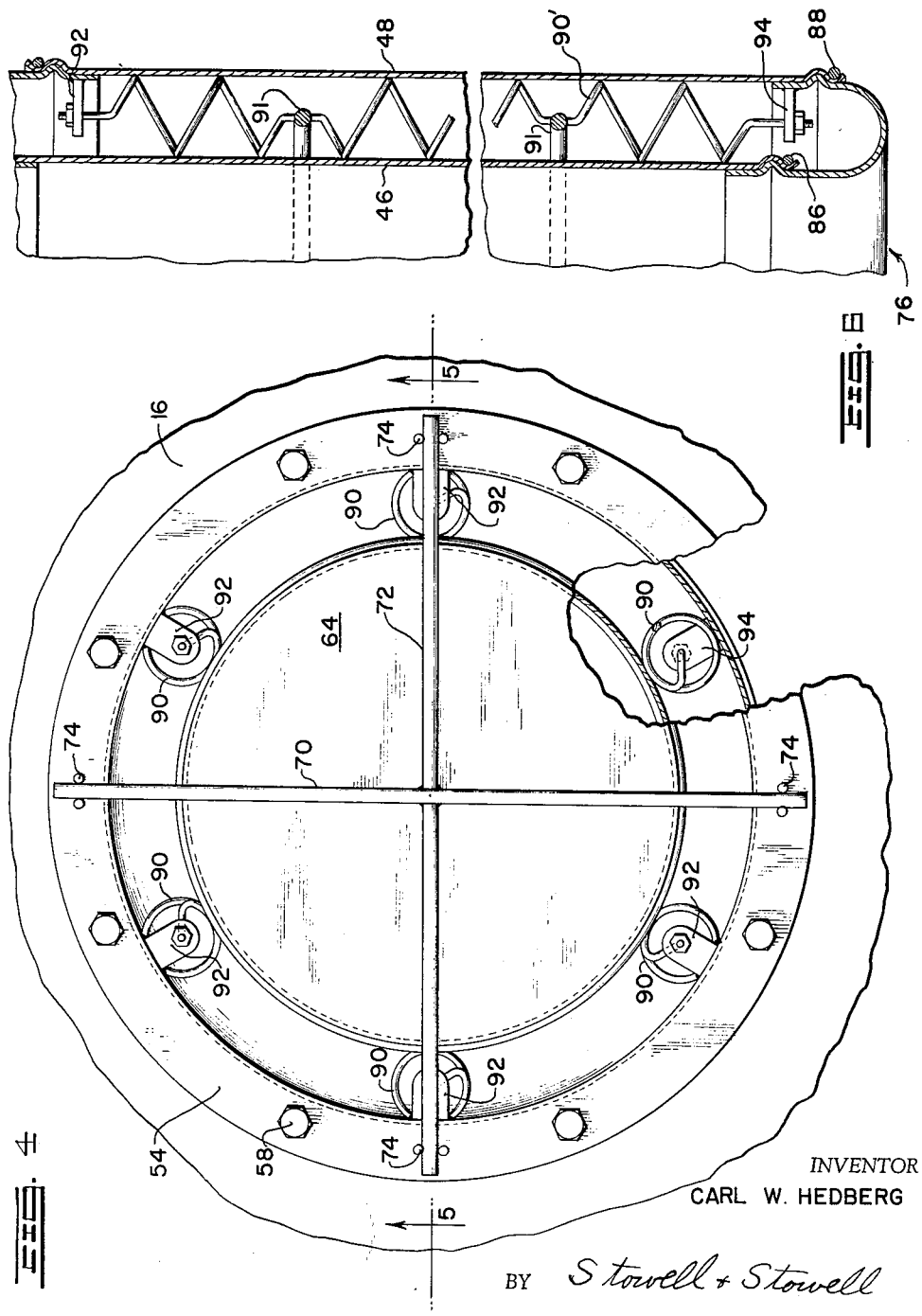

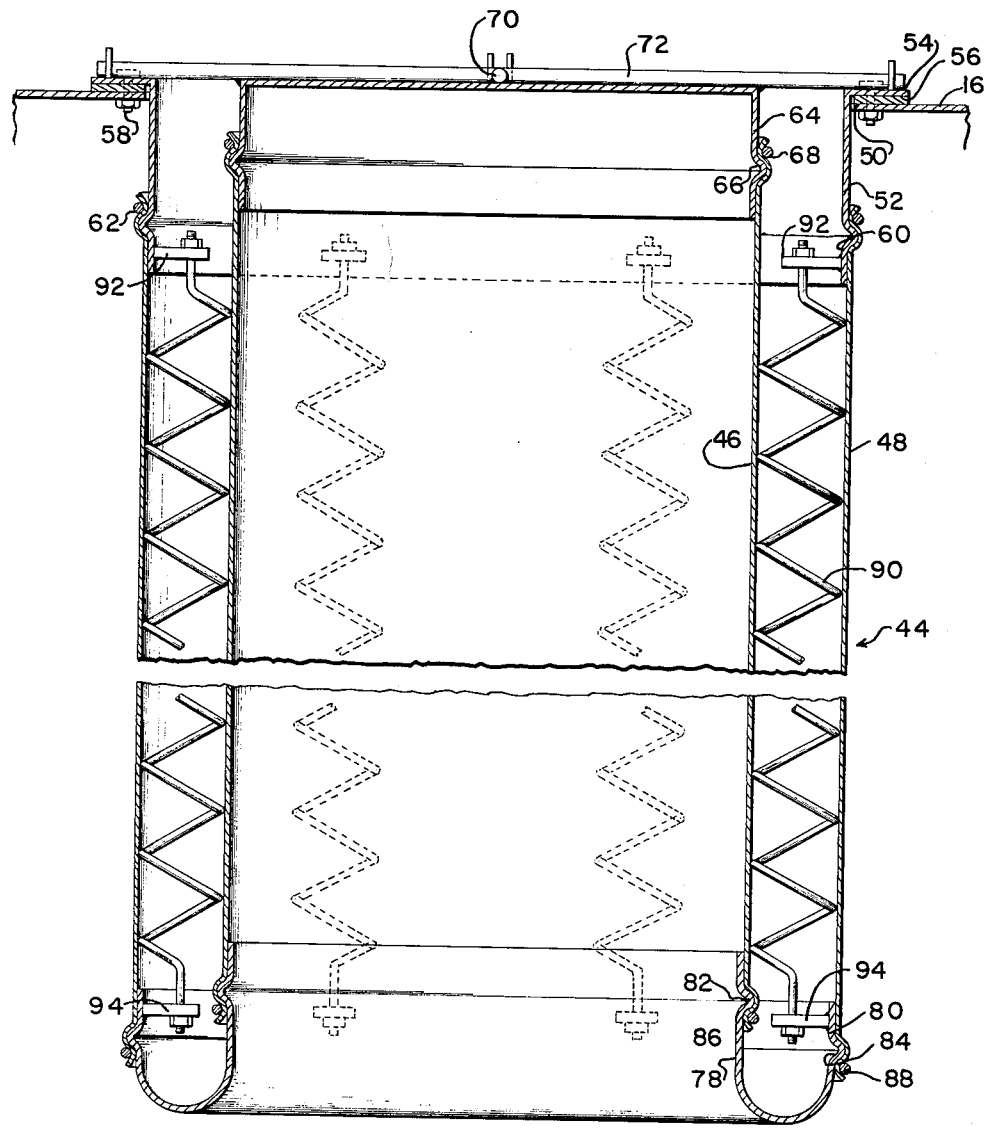

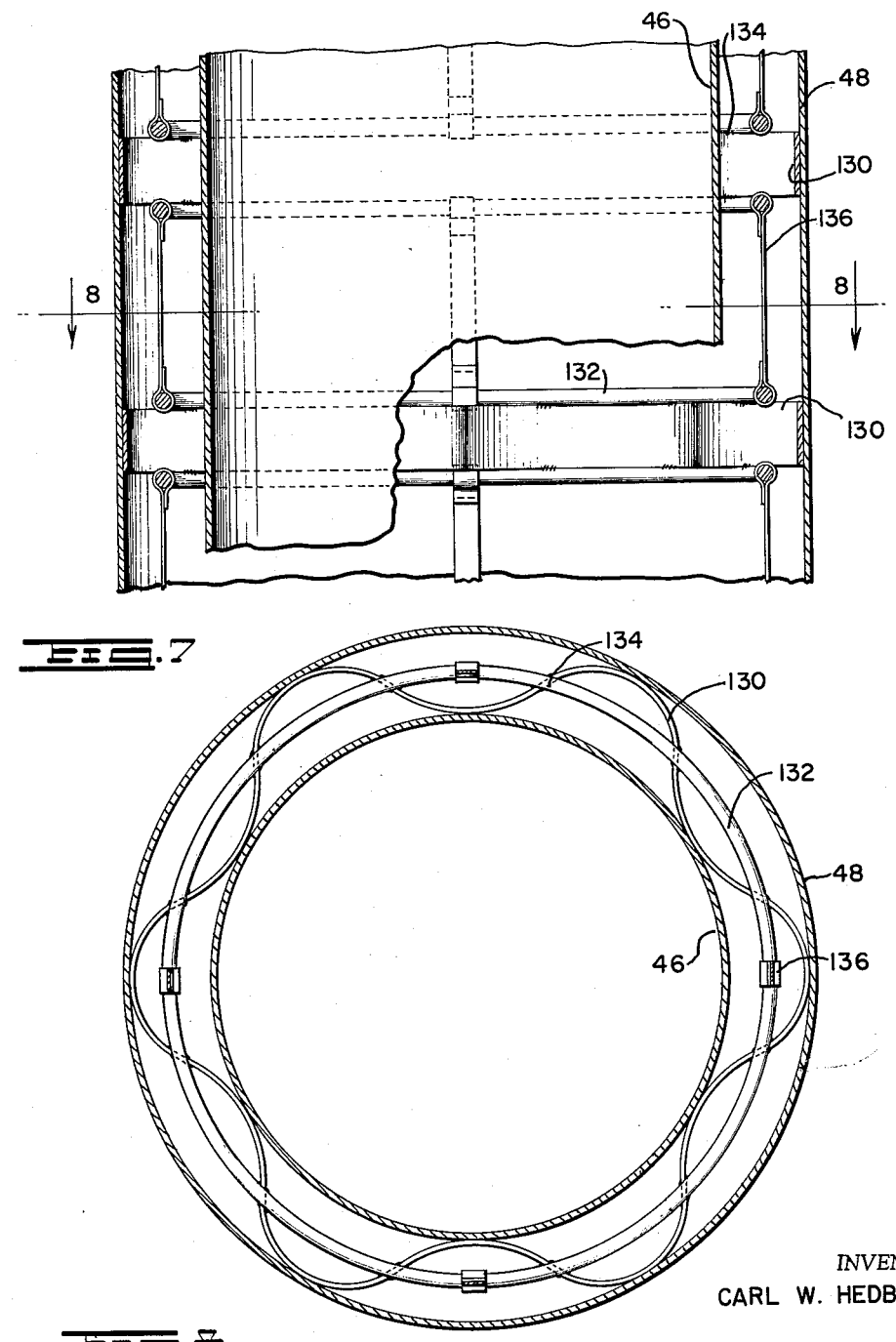

1

3,092,479
DOUBLE BAG FILTER
Carl W. Hedberg, 724 Watchung Road,
Bound Brook, N.J.
Filed June 1, 1960, Ser. No. 33,169
2 Claims. (Cl. 55—341)

The present invention relates to industrial gas cleaning apparatus and, more particularly, to a bag type gas filtering arrangement which in its simplest form comprises a pair of coaxial filtering elements provided with support means therebetween which is non-rigid in periods of non-use and rigid in operation.

Concentric bag type filter apparatus is known in the gas cleaning field wherein the apparatus is employed in relatively low volume applications such as in household vacuum cleaners. An example of such apparatus is illustrated and described in United States Patent 2,116,085 to W. A. Van Berkel entitled "Vacuum Cleaning Apparatus." In this type apparatus, the length of the filtering bags is of the order of 1 to 2 feet. The filtering bags in this apparatus are readily positioned within the main housing through a removable top access portion. Further, in an apparatus of this type, the dual bags are rigidly supported in spaced relationship from one another by an apertured double wall cylinder.

In industrial gas cleaning apparatus of the type with which the present invention is concerned, a multiplicity of concentric bubble filter bag units is employed, each of which is of the order of 12 to 20 feet in length and is of considerable weight. Access to these filter elements is not practical through a single top access opening in the main housing due to the large size of the filter elements, but rather is provided through individual manholes in the housing over each filter element assembly and others spatially arranged in the side walls of the housing adjacent the filter elements. In such large sizes, rigid frames used for supporting the filter bags in spaced relation in the vacuum cleaner type apparatus would not be suitable in the large industrial gas cleaning apparatus due to their susceptibility to deformation in manufacture, shipment, and installation. The assemblies of the prior art, due to their rigidity, require access openings which are considerably larger than the diameter of the actual filter units because of their rigid nature and the care which must be taken to avoid deforming their cross-sectional shape during installation, repair or removal.

In an attempt to decrease the overall size of the main housing of the filter assemblies, without decreasing the area of the filtering media, two problems face the construction of such filter assemblies; namely, the rigidity of the cylindrical framework of the conventional filter element and the attendant space requirements for installing, removing, or repairing the filter elements within the main housing. Since there is manifestly a requirement that the filter bag elements be rigid in operation and the conventional framework was not satisfactory, some means for supporting the filter elements was necessary. The present invention has solved this problem by producing an arrangement which is relatively non-rigid or flexible in periods of non-use and becomes rigid in operation. Broadly, the invention consists of a concentric double bag filter assembly, the inner bag of which when inflated,

2 effects a substantially rigid support for the outer filter bag, which deflates as the gases pass from the outside thereof toward the inside. The rigid support is effected by a plurality of spacer elements disposed between the outer surface of the inner bag and the inner surface of the outer bag.

It is an object of the present invention to produce a filter assembly which will provide a substantial increase in the filtration media which can be provided in a given housing relative to the amount normally provided in that size housing with the conventional bag filter arrangement.

A further object of the present invention is to produce an arrangement which is effective for the removal of dust deposits upon and within the filter media by automatic means.

Still a further object of the invention is to provide an arrangement of filter components which can be shop fabricated for easy and inexpensive field assembly and replacement when failure occurs in service.

These and other objects and advantages of the invention will become readily apparent from reading the following detailed description in connection with the attached drawings, in which:

FIG. 1 is an elevational view partially with portions partially broken away of the invention taken along line 1—1 of FIG. 2;

FIG. 2 is an elevational view taken along line 2—2 of FIG. 1;

FIG. 3 is an enlarged sectional view of the filter media cleaning mechanism taken along line 3—3 of FIG. 1;

FIG. 4 is a fragmentary top view partially broken away of one of the double bag filtering units of the invention;

FIG. 5 is a sectional view of the dual bag filtering element taken along line 5—5 of FIG. 4;

FIG. 6 is a view similar to FIG. 5 showing a modified version of the spacer elements of FIG. 5;

FIG. 7 is a fragmentary sectional view partially broken away of a dual bag filter assembly illustrating a further modification of the spacer elements; and FIG. 8 is a sectional view taken along line 8—8 of FIG. 7.

Referring to FIGS. 1 and 2, there is shown a gas cleaning apparatus incorporating the concepts of the present invention. More particularly, there is shown a main housing 10 having a top closure 12 and bottom hoppers 14 Apertured header plates 16 are attached to the inside of the housing walls in the upper portion thereof to provide a gas-tight separation in the housing 10 to define a gastight separation between upper chambers 18 and lower chambers 20. The header plates 16 are formed to receive the filter components which are attached to the header in a manner shown and described hereinafter. Internally, the housing 10 is divided into four separate units by partition walls 22 which are adapted to extend through both the upper and lower chambers 18 and 20, respectively.

The gas to be treated is supplied to the filter assembly through two primary dirty gas inlets 24, a separate inlet being provided for each pair of units. It will be clearly seen from FIG. 2 that the gas inlet ducts 24 are so constructed that the gas entering is channeled in either one or two main sections of the inlet ducts. It will be noted that the inlet ducts are fitted with a gas-tight common divider element 26 which provides separate ducts from the primary inlet 24 to the fore and aft units of the overall assembly. Each duct may be provided with distribution vanes as required for uniform gas flow within the ducts. At their lower end, the ducts are provided with a closure member 28 operative to selectively prevent gas flow into any selected section of the assembly. The closure members 28 are each individually operated by a rod element 30 which is guided by sleeves 32 and is adapted to extend through the top portion of the filter.

With this arrangement, the hopper sections 14 in effect act as distribution chambers in which the gases are slowed down and their direction reversed for flow into and around the bag filtering elements which will be described in detail hereinafter.

A well 34 is provided in the upper chamber 18 and is in operative communication with each of the upper chamber units which are defined by the walls 22 through openings 36. It will be noted that the walls defining the well 34 extend above the roof portion 12 of the housing 10 and an opening 38 is provided in this extension and is attached to an outlet through 40 in which is disposed a propeller type fan 42.

The filter components of the present invention consist of a plurality of filter bag units 44 and as shown in FIGS. 4 and 5, consist of two open-ended bag elements 46 and 48 which when inflated form open-ended vertical concentric cylinders. For the purpose of illustration, the inner bag 46 may be approximately 12 inches in diameter and the outer bag 48, 16 inches in diameter, but manifestly, other suitable diameters may be used, depending on the general economics of fabrication. These bags are of fabric material, as commonly used in this class of device and may be varied to suit the conditions under which the equipment will operate.

The selection of the relative diameters of the inner and outer bags 46 and 48, respectively, depends on the area of the annular space between the bags which must be provided. In operation, the bags 46 and 48 are hung from a top support assembly secured to the apertured header plates 16. Referring specifically to FIGS. 4 and 5, it will be noted that there are apertured header plates 16 disposed in the upper part of the housing 10 and provided with a plurality of spaced apertures 50 adapted to receive the bag assemblies. The top support for the outer bag 48 comprises a sleeve 52 having at its top portion an annular flange 54 adapted to rest upon the peripheral marginal edge of the apertures 50 formed in the plate 16. A gasket 56 disposed between the flange 54 and the plate 16 and is held firmly in place when the fastening means 48 are tightened. A bead 60 is formed in the lower portion of the annular sleeve 52 and has an outside diameter slightly larger than the diameter of the bag element 48. The bag 48 is pulled over the bead 60 and retained in place by means of a tie rope 62 in a conventional manner.

The inner bag 46 is supported from an inverted panlike member 64, the top of which is closed as clearly shown in FIG. 5. A bead 66 is formed in the lower end of the wall of the element 64 and has an outer diameter somewhat larger than the diameter of the inner bag 46. The inner bag 46 is pulled over this bead and positioned therewith a tie rope arrangement 68 in a manner similar to the outer bag 48. Two supporting rods 70 and 72 are welded together or otherwise attached to form right angular relationship to one another. The rods 70 and 72 are of a length approximately equal to the outside diameter of the outer bag support or annular flange 54. Four receiver units 74 comprised of spaced upstanding elements are attached to the flange 54 and are adapted to receive the ends of the cross bars 70 and 72 and thereby position the inner bag 46 in concentric arrangement with respect to the outer bag 48.

Referring particularly to FIG. 5 which shows also the bottom construction of the filter bag units, it will be noted that there is a metal stamping formed as an open-top torus ring 76 having an inner wall 78 projecting slightly above the outer wall 80. Beads 82 and 84 are rolled into the upper ends of the walls 78 and 80, respectively, with the bead diameters slightly larger than the diameters of their respective bag elements 46 and 48, respectively. The bags are stretched over the beads and fixed in place with rope ties 86 and 88 in the conventional manner similar to the top portions.

In order to maintain the desired spaced relation between the bag filter elements 46 and 48 and also to support a portion of the weight of the metal torus ring 76, there is provided a multiplicity of spring-like members 90 spatially disposed within the region defined between the outer surface of the inner bag 46 and the inner surface of the outer bag 48. The topmost portions of the spring elements 90 are secured to apertured elements 92 which are welded or otherwise secured to the inner surface of the metal sleeves 52. The bottom portion of the spring elements 90 are secured to radially inwardly extending elements 94 which are welded or otherwise suitably secured to the inner surface of the outer wall 80 of the torus ring 76.

Now referring to FIGS. 1, 2 and 3, there is shown a clean gas supply system which is employed to periodically provide a reverse flow of clean gases through the system in order to dislodge any material collected on the side walls of the filter bag elements 46 and 48 and thereby clean the system for further dirty gas cleaning operations. More particularly, mounted on the top of the well 34, there is an auxiliary blower arrangement generally indicated at 94 driven through a pulley arrangement by a drive motor 96. A flue 98 is connected to the well 34 and to the inlet of the fan or blower 94. The inlet 98 is in the form of a T and is provided with close-off goggle type valve devices 100 and 102. The purpose of these is to provide a fresh outside air supply to the operational unit when it must be entered in order to replace a filter component. At such time, the goggle device 102 is closed and the goggle valve device 100 is opened. The blower discharges through a fan outlet 104 into a rotatable duct 106 which rotates on a pivot bearing 108 and guided by a bearing element 110. At its upper end, the arrangement is provided with a felt gasket which substantially seals it against gas escape at this location by its contact with the underside of the well roof.

The rotatable duct 106 is further provided at its lower end with a right-angle turn which terminates in a sleeve 112 which is of slightly increased diameter. Attached to this sleeve is a collapsible fabric assembly 114 in the form of a frustocone. At its larger diameter, the fabric assembly 114 is fitted with a forming ring 116 to which is attached a plurality of spring elements 118 for collapsing the assembly. Also attached to the ring 116 is a slitted parachute-like section 120 which seats against a felt gasket attached to the flanges of the gas openings 36, thereby providing a connection between the auxiliary fan outlet and the several operational unit top compartments defined by the housing 12 and the partition walls 22.

Attached to the rotatable duct 106 is a gear wheel 122 having geared teeth formed around its inner periphery. A small gear 124 mounted on a shaft 126 driven by a motor 128 engages the gear teeth in the wheel 122 for rotating the rotatable duct 106 and positioning the parachute element 120 at the openings connecting to the operable sections of the filter unit.

From the above description, it will be apparent that in operation the dirty gas to be cleaned enters through the primary intake 24 and is then distributed to the separate units of the assembly from which it passes through the filter media into the annular space between the bags 46 and 48 which form the filter components, the solids being separated out on the upstream side of the filter media. From these annular spaces, the gas flows into the top chamber 18 and thence into the well 34 and to the outlet duct 40. It must be understood that the arrangement of the filter bag units may take a number of different configurations other than that specifically shown in the drawings and, of course, may have only two instead of four operational units as shown in the drawings. Also, the number of filter bag components 44 comprising the operational units may be varied in accordance with their application.

In order to clean the filter bag units 44, the following operational steps are followed:

(1) Stoppage of the normal gas flow and the consequential deflation of the filter bags 44;
(2) Sudden re-inflation of the bags 44 in a reverse direction from the normal flow inflation;
(3) Reverse gas flow of clean gas through the filter media to remove the dust deposited within the media;
(4) Operational unit arrangement for cleaning a portion at a time while the remainder continues operative and a single reverse flow system common to all units.

The volume of reverse air flow required for proper cleaning will bear relationship to the physical volume of the filter on the downstream side of the filter media. In a typical arrangement comprising sixteen filter elements with the individual components 20 feet in length, the physical volume would be approximately 400 cubic feet. Depending on the nature of the deposit on the media, the rate of supplying reverse gas will be in the range of from approximately 2,000 to 8,000 cubic feet per minute for this physical volume or a ratio in the range of 5 to 20.

It will be understood that in normal operation, the parachute element 120 is positioned between two adjacent openings 36 which communicate with the various operational units. A master control of this system will be provided through a pressure differential switch. When the pressure drop across the filter exceeds a preset limit, this switch will commence the cleaning operations automatically. One satisfactory unit consists of switch contacts which close simultaneously after a timer starts to operate. One pair of switches is operative to start the motor 128 and rotate the clean air duct to a position in line with the next opening in the direction of rotation when in line the contacts will open and stop the motor 128. The other pair of contacts is operative to close the intake's damper through the rods 30 and thereby closing off the intake of dirty gas and effectively collapse the filter bag elements 44.

Another pair of switch contacts is employed to close after the contacts controlling the motor 128 are opened and stop the motor. These contacts are operative to start the drive motor 96 for operating the blower unit 94. The gas flow thus set up will pass through the parachute element 120 and position it against its seat in the opening 36, thus sealing the unit from the others so that there will be a backflow through the unit being cleaned. While this reverse flow is being maintained, additional contactors will operate mechanism to automatically open and re-close the inlet dampers 28 for one or more cycles. Preferably, the opening and closing periods will be short so as to set up a "puff" action within the bags 44 and thereby increases the separation effect between the deposit and the filter media. Following the completion of the "puff" cycles, switch contacts will operate to place an inlet valve in open position and shut down the fan drive motor 96. Finally, another pair of contacts will close to operate the motor 128 and move the device midway to the next operation opening when they will open and shut down this motor until a pressure switch calls for repeating the entire cleaning cycle.

Other modifications of the structure thus far described are shown in FIGS. 6, 7 and 8. With specific reference to FIG. 6, there is a modification of the spacing elements between the filter bag elements 46 and 48. Instead of the spring members 90, as clearly shown in FIG. 5 which extend the full length of the filter bag units 44, spring members 90' are provided in the form of a series of shorter spring sections with a plurality of spaced ring connectors 91 between them. The spacer elements 90' are secured within the filtering units in the same manner as shown in the earlier described embodiment.

Another embodiment of the invention is shown in FIGS. 7 and 8. A strip metal 130 is formed into a spacer element of general form as clearly shown in FIG. 8. The spacer elements 130 are reinforced by an annulus 132 of metal which is spot-welded to the adjacent surface of the spacer element 130 as shown at 134, for example. If necessary, these reinforcing annuli 132 may be applied to both the upper and the bottom edges of the spacer elements 130 as shown in FIG. 7.

At spaced points about the assembly, strips of fabric webbing 136 are looped about the reinforcing annuli 132. The webbing strips 136 support a number of superimposed spacer elements 130 separated as required for the proper support point spacing. Adjacent spacers may be shifted so as to place the support point of one intermediate the support points of the adjacent spacers. The vertically extending webbing strip 136 attached to the top bag support and the bottom closure in the same manner as the vertical springs 90 and 90' shown in FIGS. 4, 5 and 6.

It will be appreciated from the above description that the present invention has produced a gas filtering apparatus which makes more efficient utilization space than the existing single bag filter and provides a simple and efficient means for removing the dust accumulation which forms on the surfaces of the filtering medium.

An antiswaying structure 29 such as that shown in FIG. 1 may be employed to positively militate against the swaying of the bottom portions of the filter bag units 44. The antiswaying structure illustrated consists of a first set of rods disposed in spaced parallel relationship which are welded or otherwise suitably secured to a similarly arranged second set of rods disposed at right angles to the first set. The rods of the first set are welded to the rods of the second set at the cross-over points. The structure 29 is suitably secured to the side walls of the main housing 10 to provide the required rigidity.

Manifestly, other means could be employed to prevent or reduce any swaying action of the bottoms of the filter bag units 44. Such other means include disposing weights into the torus ring 76 through the spaces between the springs 90. Another means for preventing the swaying of the bottoms of the filter bag units 44 is to secure a small bar across the bottom of the torus ring 76 and then in turn fasten this bar to a bar traversing the top of the hopper bottom, by springs.

In accordance with the provisions of the patent statutes, I have explained the principles and mode of operation of my invention and have illustrated and described what I now consider to represent its best embodiments. However, I desire to have it understood that, within the scope of the appended claims, the invention may be practiced otherwise than specifically illustrated and described.

I claim:

1. A gas filtering apparatus comprising a housing having a dirty gas inlet and a clean gas outlet, a plurality of double walled filters disposed within said housing between said dirty gas inlet and said clean gas outlet, each of said filters having an inner and an outer bag, means for suspending said bags within said housing, a plurality of elongate spring elements for maintaining a spaced relationship between the inner and outer bags of said filters, and an annular member of generally U-shaped cross-sectional configuration attached to the bottom of each of said filters, the upper terminal portion of said spring elements being attached to said means for suspending said bags within said housing, and the lower terminal portion of said spring elements being attached to said annular member.

2. A gas filtering apparatus comprising a housing having a dirty gas inlet and a clean gas outlet, a plurality of double walled filters disposed within said housing between said dirty gas inlet and said clean gas outlet, each of said filters having an inner and an outer bag, means for suspending said bags within said housing, and means for maintaining a spaced relationship between said inner and outer bag comprising a plurality of vertically spaced corrugated annuli, each annulus of said plurality being connected to the adjacent annuli by flexible strap means.

References Cited in the file of this patent

UNITED STATES PATENTS

| | | |
|---|---|---|
| 1,633,818 | Kogstrom | June 28, 1927 |
| 1,762,224 | Guthmann et al. | June 10, 1930 |
| 2,355,373 | Hankinson | Aug. 8, 1944 |
| 2,789,659 | Hemscheidt | Apr. 23, 1957 |
| 2,850,112 | Dru | Sept. 2, 1958 |

FOREIGN PATENTS

| | | |
|---|---|---|
| 113,593 | Australia | July 31, 1941 |
| 242,388 | Great Britain | Nov. 2, 1925 |
| 800,195 | Great Britain | Aug. 20, 1958 |
| 827,314 | Germany | Jan. 10, 1952 |
| 898,248 | Germany | Nov. 30, 1953 |